United States Patent [19]

Aoki et al.

[11] Patent Number: 5,136,865
[45] Date of Patent: Aug. 11, 1992

[54] LOW-TEMPERATURE STORAGE

[75] Inventors: Ken Aoki, Ashikaga; Katsuhiko Hoshi, Ota, both of Japan

[73] Assignee: Sanyo Electric Co. Ltd., Osaka, Japan

[21] Appl. No.: 614,304

[22] Filed: Nov. 16, 1990

[30] Foreign Application Priority Data

Nov. 17, 1989 [JP] Japan .................................. 1-297645

[51] Int. Cl.$^5$ .............................................. F25B 49/00
[52] U.S. Cl. ..................................... 62/126; 62/175; 62/203
[58] Field of Search .................. 62/125, 126, 127, 129, 62/130, 175, 203, 208; 236/94; 165/11.1; 364/557; 340/585, 870.17

[56] References Cited

U.S. PATENT DOCUMENTS

| 4,014,178 | 3/1977 | Kells | 62/125 X |
| 4,387,578 | 6/1983 | Paddock | 236/94 X |
| 4,646,528 | 3/1987 | Marcade et al. | 62/127 |

Primary Examiner—Henry A. Bennet
Assistant Examiner—John Sollecito
Attorney, Agent, or Firm—Stanger, Michaelson, Spivak & Wallace

[57] ABSTRACT

A low-temperature storage of the invention has N refrigeration units that may be used for independently refrigerating N chambers, and a controller having N sets of temperature region setting means and corresponding N temperature settling means usable for N refrigeration chambers. Each of said temperature region setting means comprises a plurality of temperature control switches which may assume a combination of ON and/or OFF states for establishing a desired temperature region in an associated chamber. Furthermore, within respective temperature regions, desirable temperatures may be preset by associated temperature setting means. When the number chambers available is less than N, said controller may be used for controlling an arbitrary number of refrigeration chambers in a desired combination of modes by setting non-used set of said temperature setting means in prohibited mode.

7 Claims, 18 Drawing Sheets

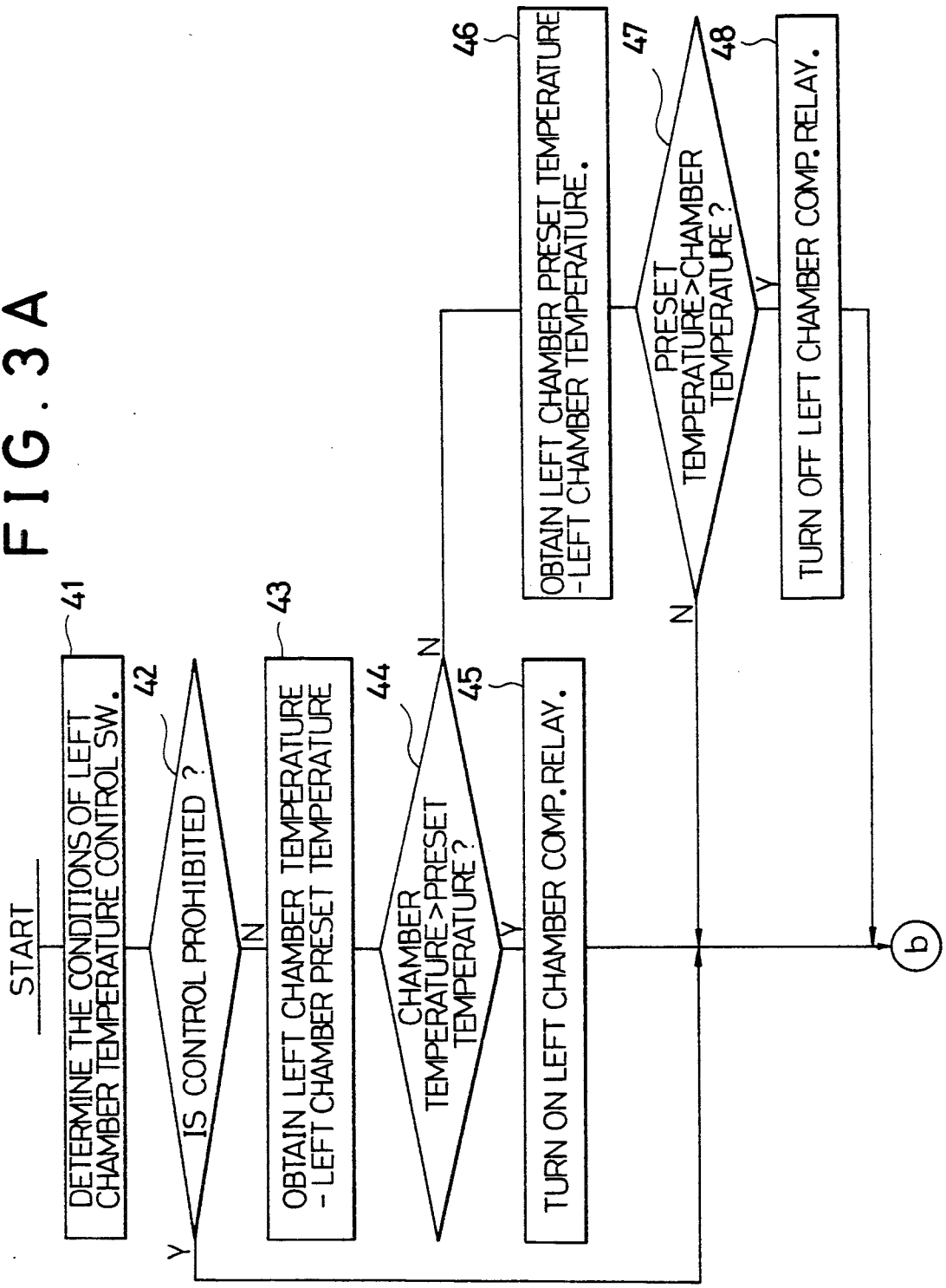

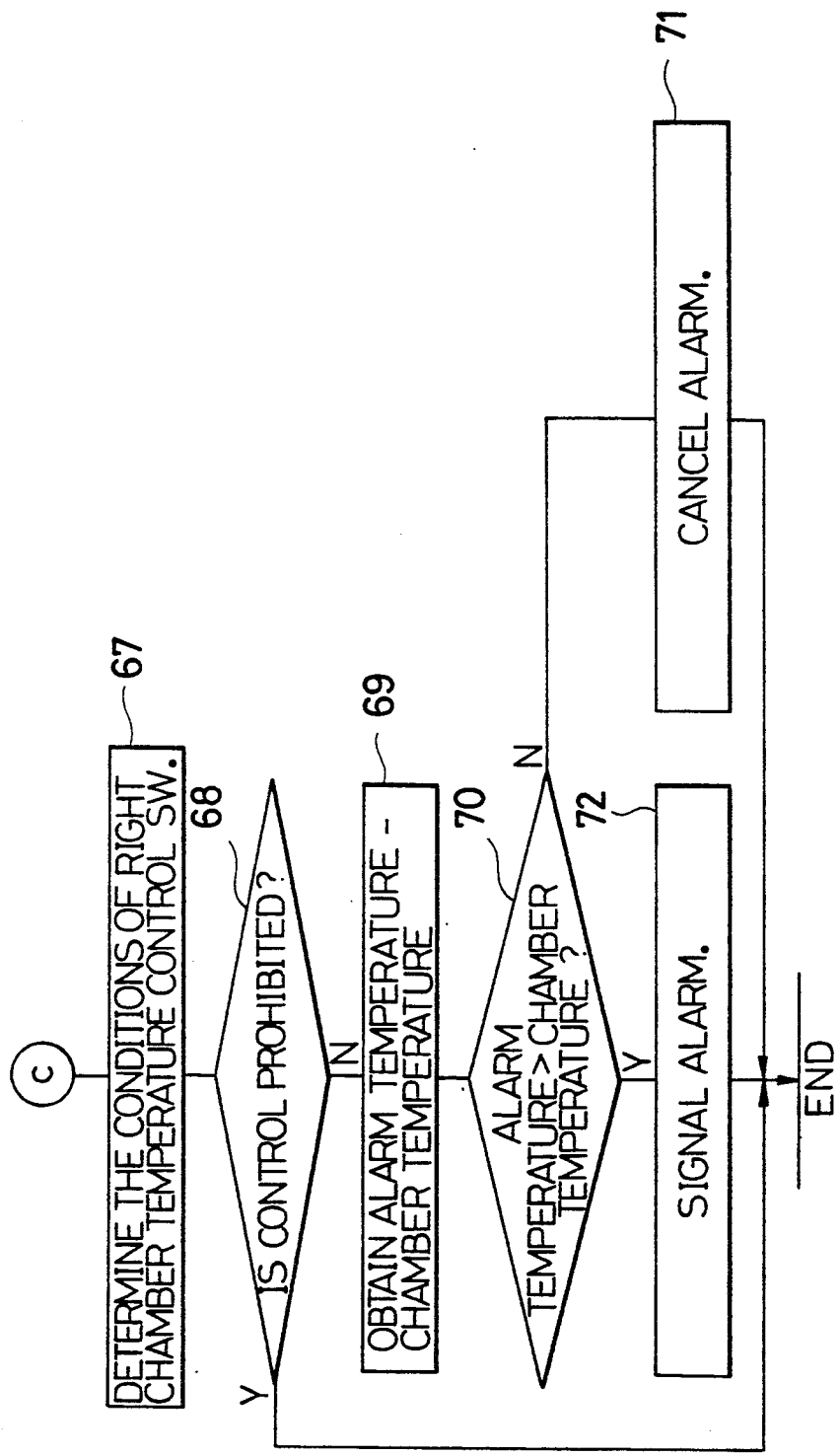

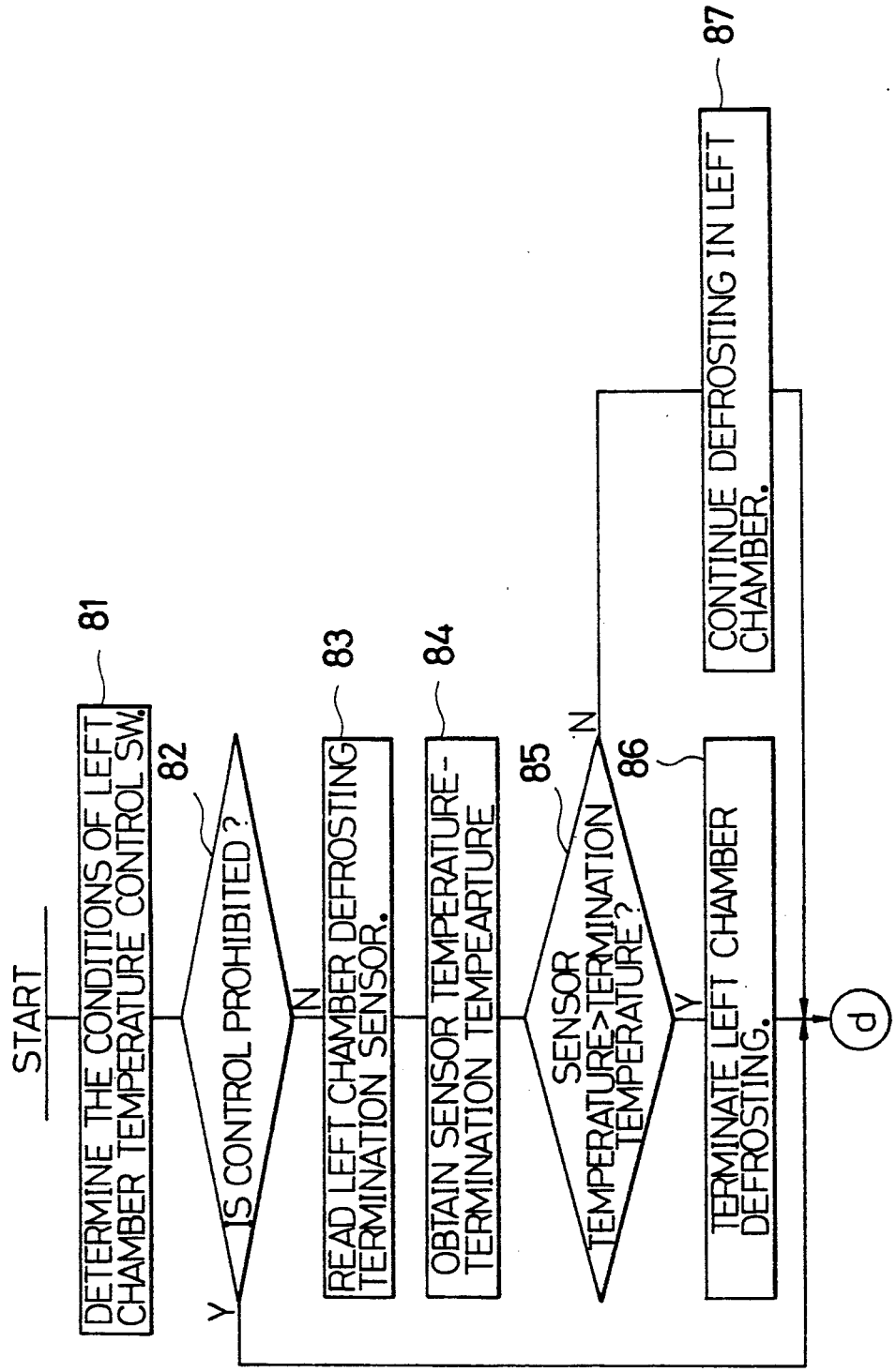

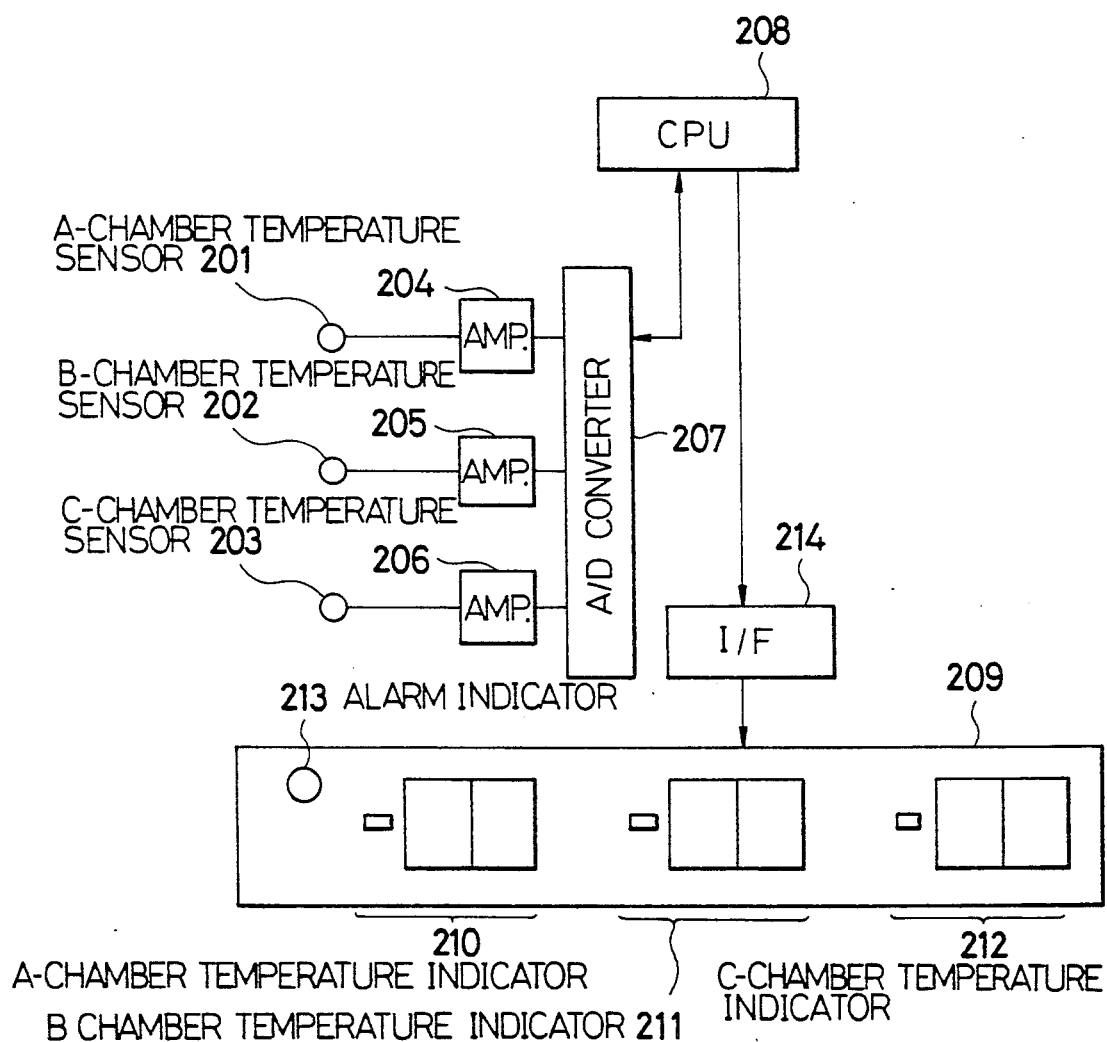

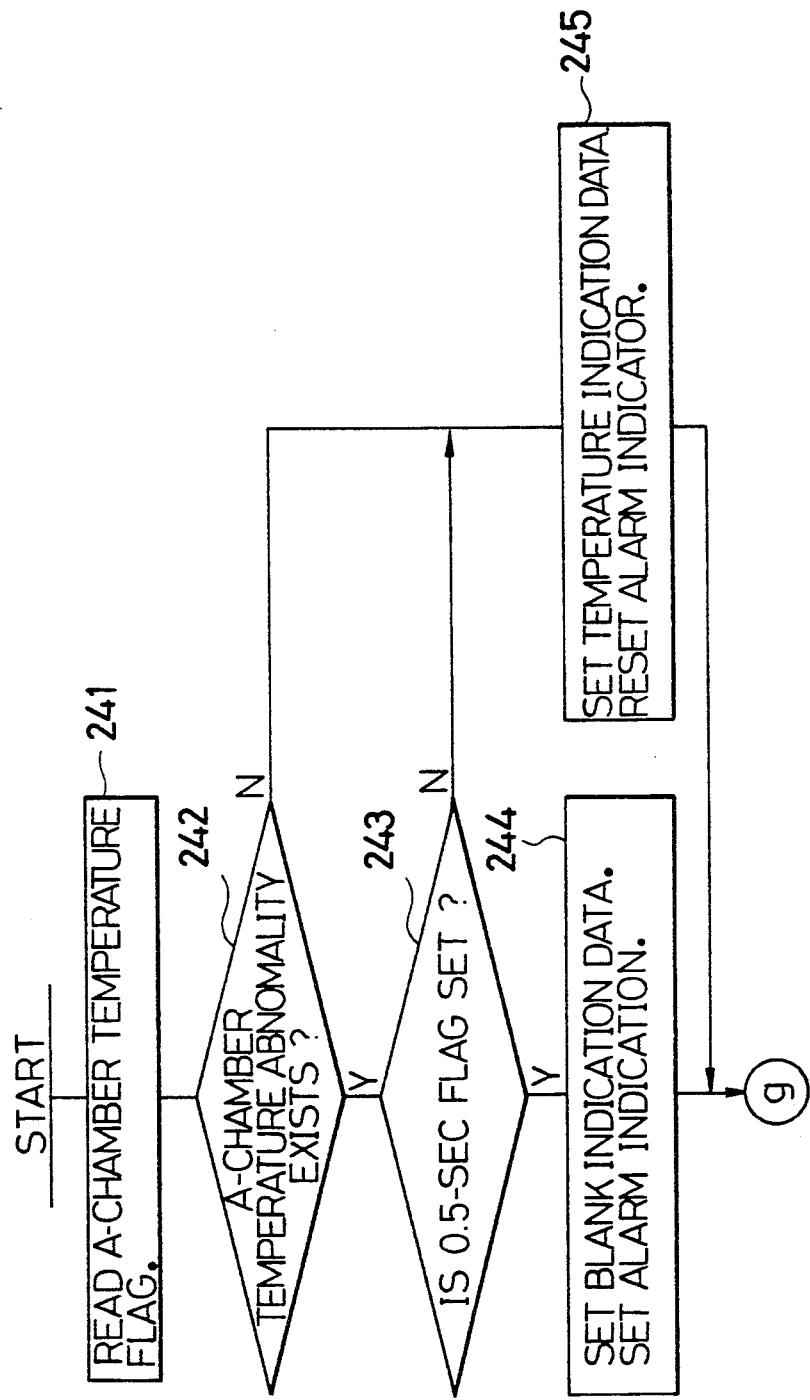

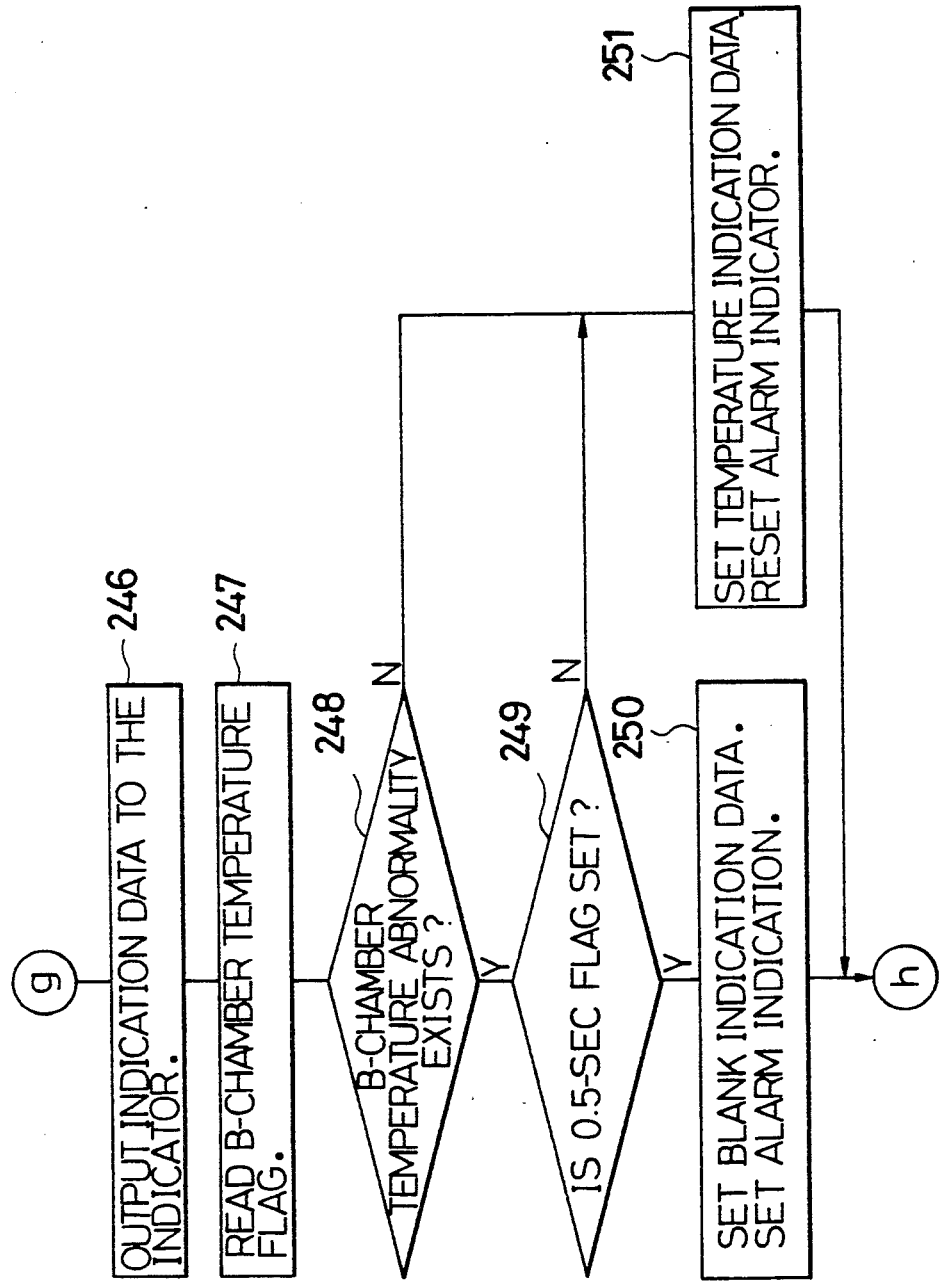

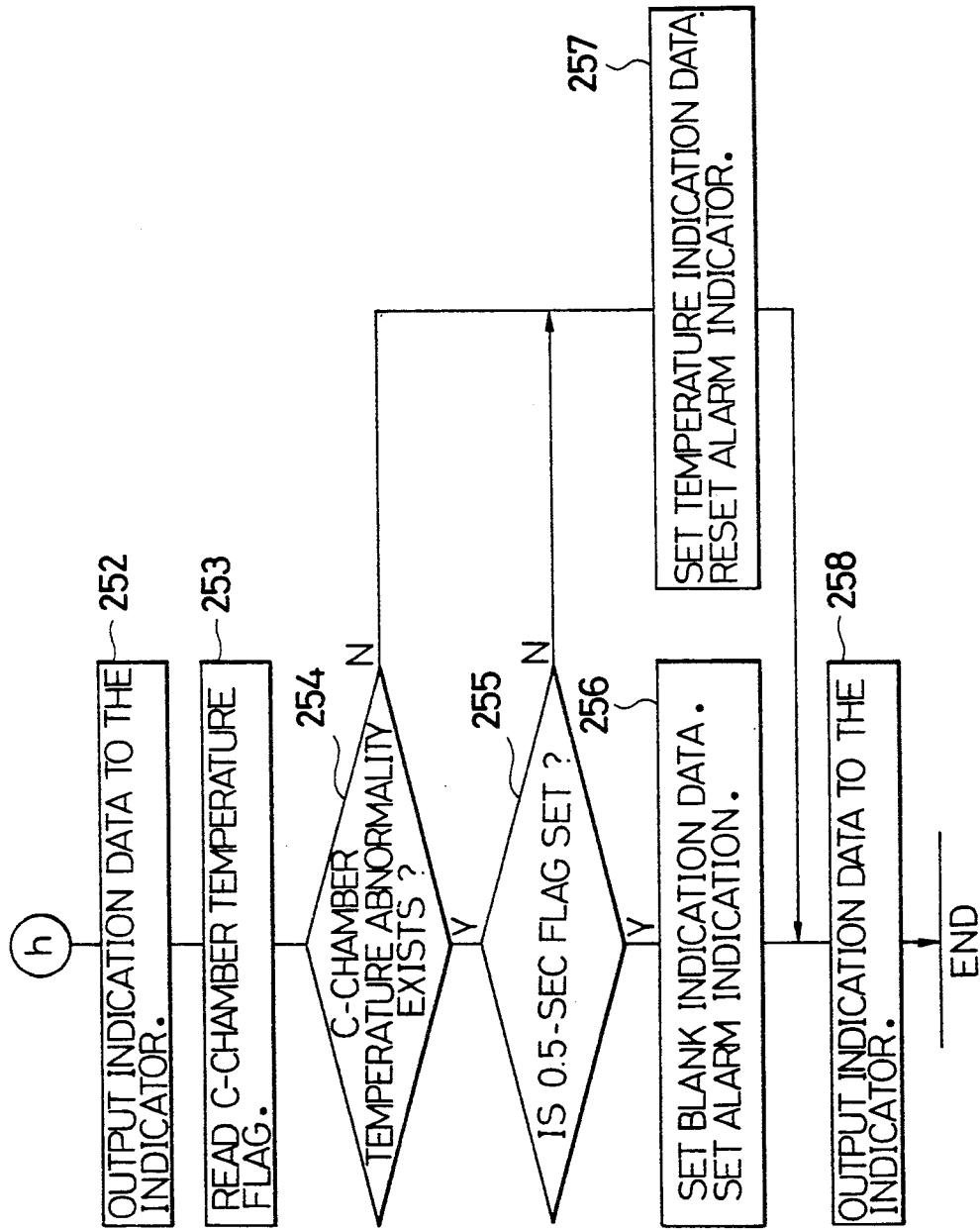

LOW-TEMPERATURE STORAGE

FIELD OF THE INVENTION

The invention relates to a refrigeration control system for controlling a refrigeration unit to maintain a freezer, a refrigerator, or a low-temperature storage chamber at its intended temperature, or controlling a multiplicity of refrigeration units to maintain an arbitrary combination of freezers, refrigerators, or low-temperature storage chambers (which combination will be hereinafter referred to as a combination refrigerator) at different preset temperatures.

BACKGROUND OF THE INVENTION

There exists a variety of low-temperature storages for storing fresh foods such as vegetables, fish, and other kinds of foods. Such storages include freezers, refrigerators, and other types of low-temperature cases. Due to recent needs for commercial refrigeration devices for storing a large quantity of varied foods, there are many types of refrigerators.

They are commonly known as freezers, refrigerators, and so-called combination refrigerators which comprise a combination of freezers and refrigerators operable at different temperatures appropriate for the goods stored therein. Therefore, such combination refrigerators conventionally required specially designed controllers suitable for their particular uses.

However, in actuality, such a conventional controller is designed on a compromise to operate at an average operating condition, based on such parameters as defrosting time (including starting time and period of defrosting), alarm conditions (such as critical abnormal temperature and permissible duration of abnormality), defrosting method (including types of defrosting heaters and period of off thermo-cycle defrosting), and chamber temperatures, so that it may be roughly applicable for all types of combination refrigerators, since designing and manufacturing varied types of controllers is inefficient and costly. Furthermore, if varied types of controllers are manufactured, their maintenance involving various repair components is cumbersome.

Since such refrigerators are not designed for optimum conditions, their operation often suffers inefficiency.

The controllers used with these conventional refrigerators are designed basically for use with one chamber, so that they cannot be used for a combination refrigerator having more than two chambers. Use of more than two controllers in a combination refrigerator is not only disadvantageous but also inadequate when more than two chambers are required to operate at different refrigeration temperatures, since no convenient means has been available for maintaining each of the chambers at a temperature specified. Therefore, a conventional combination refrigerator requires as many control systems as the combination of the temperatures used.

These professional freezers, refrigerators, and combination refrigerators having a plurality of refrigerating chambers are used in certain particular temperature ranges for specific purposes.

In these cases temperature indicators are used for indicating the preset temperature as well as the current temperature of a chamber by selecting one of possible indication modes. Such a double purpose indicator may indicate the preset temperature by, for example, a first push of a push button switch, and the current chamber temperature by a second push. However, after a number successive switchings, one may often lose keeping track of the current status of the switch. In order to avoid such inconvenience an indicator or a lamp is normally provided to notify the operator the status of the switch.

However, this type of temperature indication has disadvantages that, for example, the provision of the indicator lamp adds some limitation to the design of the controller and an extra indication circuitry is need for the indicator.

It is often the case that abnormal thermal conditions take place in the refrigeration chambers during refrigerating operation. Conventionally, such abnormality is indicated by a common alarm indicator or a set of alarm indicators provided one for each chamber.

Although such a conventional alarm system may indicate the abnormality, it cannot, in the case of common indicator, point out the specific chamber suffering from the abnormality until each chamber temperature is compared with its preset preset temperature, requiring cumbersome procedures. On the other hand, the use of alarm indicators provided for individual refrigeration chambers requires the same number of indicators as the number of the chambers. This in turn requires many circuits and components, and might fail to attract operator's due attention.

BRIEF SUMMARY OF THE INVENTION

The invention is directed to resolve such problems. Therefore, an object of the invention is to provide a low-temperature storage having a temperature controller comprising a multiplicity of independent control channels and capable of controlling an arbitrary number of refrigeration chambers less than the number of the channels by setting the non-used channels in prohibited mode, thereby permitting control of a refrigerator or a freezer as well as a combination of freezer and refrigerators.

Another object of the invention is to provide means for distinguishable visible indication of the two-temperatures indicative of the current chamber temperature and the preset preset temperature associated with the chamber, thereby enabling unmistakable presetting the preset temperature.

Still another object of the invention is to provide a combination of low-temberature storage chambers with an alarm indication system that may precisely indicate a particular chamber suffering from thermal abnormality.

In order to attain these object the invention provides a low-temperature storage having a refrigeration chamber or refrigeration chambers refrigerated independently by a refrigeration unit or refrigeration units, said chamber for use as a freezer, a refrigerator and chambers for use as a combination of a freezer and refrigerators or as a combination of refrigerators operable at different temperatures, comprising a controller, said controller having:

multiple N sets of temperature region setting means each having a plurality of temperature switches for establishing desired temperture regions for respective chambers by setting said switches ON or OFF;

a multiplicity N of temperature setting means provided one for each of said temperature region setting means for presetting, within respective said temperature regions, desired temperatures in respective chambers by selectively presetting the temperature setting means, and characterized in that said controller may be used for controlling arbitary number of refrigeration chambers in a desired combination of modes if the number of chambers available is less than N, by setting non-used set of said temperature setting emans in prohibited mode.

According to the invention, in controlling a low-temperature storage having at least two chambers, various control parameters such as temperatures for individual chambers may be set by means of a multiplicity of temperature control switches, each of which may be set ON or OFF to establish various modes of refrigeration of the chambers in various temperature regions. Furthermore, such varied modes of refrigeration may be controlled by one controller mentioned above.

The controller controls the operations of the refrigeration unit or units associated with ech chamber, by for example stopping and restarting one or some of the refrigeration units.

When the number of the refrigeration chambers is less than the number of the temperature region setting means, those temperature setting means not used are set in prohibited mode so that the controller may be applicable even for a storage having only one chamber and one refrigeration unit, rendering the chamber to be a freezer or a refrigerator.

In this way the controller may deal with any type of low-temperature storage including a combination refrigerator, thereby permitting economical manufacture of efficient and versatile low-temperature storages.

Further, according to the invention, the chamber temperatures may be set in two steps: first by selecting temperature ranges for the chambers by means of the temperature control switches, and then setting the preset temperatures in the selected regions at which associated chambers are maintained during their operation. This easily permits accurate control in temperature for the chambers.

The low-temperature storage having a refrigeration chamber or chambers for use as a freeze/refrigerator or as a combination of freezer and refrigerators that operate at different temperatures, comprises:

a temperature indicator for selectively indicating the chamber temperature in one of said chambers and the preset temperature of the chamber in such a way that the preset temperature is indicated together with a flasing "°C."-mark, while the chamber temperature is indicated together with non-flashing "°C."-mark.

Such flasing "°C." indication tells the observer that temperature indicated is the preset temperature.

On the other hand the user may distinguish the current chamber temperature from the preset temperature since "°C." indication does not flash.

In this manner a single temperature indicator may provide distinct indication of the current chamber temperature and the preset temperature, which is useful in setting the preset temperatures and temperature management of the storage.

Also, according to the invention, the low-temperature storage having a multiplicity of refrigeration chambers each operating at different controlled temperatures, comprises:

chamber temperature indicators one for each chambers, an alarm indication system for indicating abnormality in temperature in said chambers by flashing said chamber temperature indicator associated with the abnormality.

From the flasing the operator may easily recognize the abnormality in temperature of the chamber.

Thus, no extra independent alarm indicator or indivudual alarm are not needed in notifying the operator of possible abnormality, thereby simplifying the structure of the controller and hence reducing the manufacturing cost therefor. Furthermore, since the temperature indicator is placed under constant surveillance of the operator, such flashing of the indicator will provide unmistakable efficient alarm of the temperature abnormality.

BRIEF DESCRIPTION OF THE DRAWINGS

FIGS. 3A and 3B together show a flow-chart for the procedure for maintaing each of the chambers at a preset temperature.

FIGS. 4A and 4B together show a flow-chart for alarm procedure.

FIGS. 5A and 5B together show a flow-chart for ending defrosting.

FIG. 8 is a control circuit in block diagram of an alarm indicator which alarms the abnormality in chamber temperature.

FIGS. 10A, 10B, and 10C together show a flow-chart for the alarm procedure when thermal abnormality has taken place in some chamber, through flashing of the chamber temperature indicated.

DETAILED DESCRIPTION OF THE PREFERRED EMBODIMENT

Figure 1:
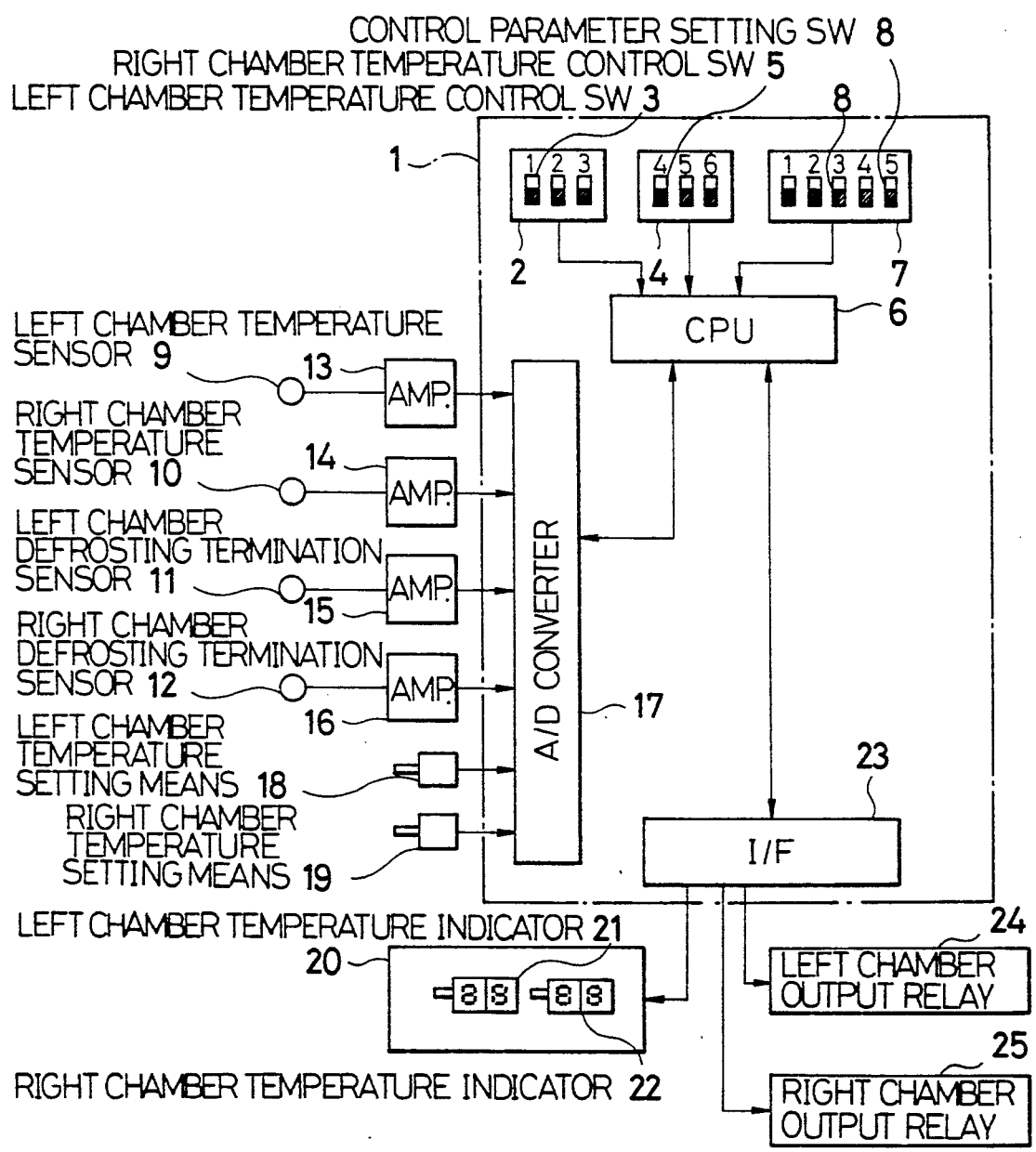
FIG. 1 is a control circuit in block diagram for a refrigeration control system of this invention, comprising a controller for controlling individual temperatures of at least two storage chambers.

FIG. 1 shows a first embodiment of the invention. Here a refrigerator includes a right and a left chamber each refrigerated by a refrigeration unit of its own (comprising a compressor, a condenser, an evaporator, etc.) under the control of a controller 1 to maintain the respective chambers at two different preset temperatures.

The controller 1 shown by a dotted frame in the figure has a left chamber temperature region setting means 2 which comprises a left chamber temperature control switching device 3 consisting of switches SW 1, 2, and 3. By choosing different ON and/or OFF combinations of these switches, it is possible to set 8 different temperature regions.

The controller also has a right chamber temperature region setting means 4 which comprises a right chamber temperature control switching device 5 consisting of switches SW 4, 5, and 6. It is also possible to set 8 different temperature regions for different ON and/or OFF combinations of the switches. The left chamber temperature region setting means 2 and right chamber temperature region setting means 4 are connected with a CPU 6 so that the values set by these setting means are input and coded therein.

The correspondence between the modes of the refrigeration, i.e. the ON/OFF settings of the left and right chamber temperature region setting means 2 and 4 and the temperature regions given by the settings is listed in TABLE 1-A and 1-B below.

TABLE 1

| $10^1$ - digit | Switch number | | | Left chamber temperature control mode |
|---|---|---|---|---|
| | 1 | 2 | 3 | |
| 0 | X | X | X | Prohibited mode |
| 1 | OFF | OFF | ON | 3~15° C. (R1: refrigeration1) |
| 2 | OFF | ON | OFF | −6~−12° C. (R2: refrigeration2) |
| 3 | OFF | ON | ON | −23~−5° C. (F1: freezing1) |
| 4 | ON | OFF | OFF | −25~−15° C. (F2: freezing2) |
| 5 | ON | OFF | ON | −45~−27° C. (F3: Extreme freezing) |
| 6 | ON | ON | OFF | −3~−15° C. (RH: high temp. high humidity) |
| 7 | ON | ON | ON | −25~−15° C. (motor damper) |

| $10^0$ - digit | Switch number | | | Right chamber temperature control mode |
|---|---|---|---|---|
| | 4 | 5 | 6 | |
| 0 | OFF | OFF | OFF | single chamber refrigeration |
| 1 | OFF | OFF | ON | 3~15° C. (R1: refrigeration1) |
| 2 | OFF | ON | OFF | −6~−12° C. (R2: refrigeration2) |
| 3 | OFF | ON | ON | −23~−5° C. (F1: freezing1) |
| 4 | ON | OFF | OFF | −25~−15° C. (F2: freezing2) |
| 5 | ON | OFF | ON | −45~−27° C. (F3: Extreme freezing) |
| 6 | ON | ON | OFF | −3~−15° C. (RH: high temp high humidity) |
| 7 | ON | ON | ON | −6~−12° C. (motor damper) |

As may be understood from this TABLE, the modes of control temperatures for the left chamber (specified by the settings of the switches SW 1, 2, and 3) and for the right chamber (specified by the settings of the switches SW 4, 5, and 6) are each numbered 1 through 7. The modes are indicated on a two-digit decimal LED indicator with the left chamber mode on the $10^1$-digit and right chamber mode on the $10^0$-digit. The modes "77", for example, refer the mode in which the temperatures of the left and right chambers are control by means of motor-driven dampers controlling the flow rate of the cool air supplied from a single refrigeration unit to the left and right chambers. As will be described later, the two-digit control mode indicator is adapted to indicate the left chamber temperature in some cases described later on.

The control mode "0" i.e. prohibited mode, is used for a single chamber, in which the right chamber switches (SW 4, 5, and 6) are all set "OFF" and only the left channel is operated in some mode defined by the left chamber switches (SW 1, 2, and 3).

Thus, although the controller 1 is designed for use with a low-temperature storage having more than one independent refrigeration units, this mode allows the controller 1 to be used with a storage having only one refrigeratin unit.

The controller 1 is provided with a control parameter setting means 7 for setting the operating parameters such as the period of defrosting, type of the condenser (e.g. water-cooled or air-cooled type), and so on. The control parameter setting means 7 may be a switching device 8 which comprises five switches SW 1, 2, 3, 4, and 5. The correspondence between the settings of these switches and the functions of the controller is shown in TABLE 2.

TABLE 2

| SW number | Parameters and Functions of the Controller | | |
|---|---|---|---|
| | Functions | ON | OFF |
| 1 | Period of defrosting for left chamber | 4 hours | 6 hours |
| 2 | Period of defrosting for right chamber | 4 hours | 6 hours |
| 3 | Switching between air- and water-cooling of the condenser | water-cooled condenser | air-cooled condenser |
| 4 | Switching between external and internal timers for defrosting period | external | internal |
| 5 | Switching between check mode and refrigeration mode | check mode | refrig. mode |

The relation of the control modes 0 through 7 to the setting of the five control switches is shown in TABLE 3.

TABLE 3

| Code for the control mode (digit for $10^1$) | SW number | | | Code for the control mode (digit for $10^0$) | SW number | |
|---|---|---|---|---|---|---|
| | 1 | 2 | 3 | | 4 | 5 |
| 0 | OFF | OFF | OFF | — | — | — |
| 1 | OFF | OFF | ON | 1 | OFF | ON |
| 2 | OFF | ON | OFF | — | — | — |
| 3 | OFF | ON | ON | 3 | ON | ON |
| 4 | ON | OFF | OFF | — | — | — |
| 5 | ON | OFF | ON | — | — | — |
| 6 | ON | ON | OFF | — | — | — |
| 7 | ON | ON | ON | — | — | — |

The control modes are indicated on a two-digit LED, with its $10^1$-order digit representing the status or the conditions of the switches 1, 2, and 3 and its $10^0$-order digit representing the status of the switches 4 and 5. Thus, for example, the indication "0", "1" represents the control mode for which the defrosting periods for the left and right chambers are 6 hours:

the timer for the defrosting is internal one:

the check mode (for checking malfunction of the controller, refrigeration units, etc.) is ON.

The control parameters setting means 7 is also connected to the CPU 6, so that the data input in the control parameters setting means 7 is stored in the CPU 6. There are provided for each of the left and right chambers a left and right chamber temperature sensors 9, and 10, respectively, and a left and a right defrosting termination sensors 11 and 12, respectively, which transmit signals to amplifiers 13, 14, 15, and 16, respectively. The amplifiers 13, 14, 15, and 16 output appropriate levels of signals indicative of temperatures to the input of an A/D converter 17. With the A/D converter 17 is connected a left and a right chamber temperature setting means 18 and 19, respectively, for furnishing signals indicative of the settings to the converter. With the temperature setting means 18 and 19 the preset temperatures may be further adjusted within the temperature regions defined by the left and right chamber temperature setting means 3 and 5. This may be done as described later. The left and right temperature setting means 18 and 19, may be, for example, rotatable variable resistors. A chamber temperature indication means 20 comprises two 7-segment LED digit indicators, one 21 for the left chamber temperature and another 22 for the right chamber temperature. The chamber temperature indicators 21 and 22 each indicate date received from the A/D converter 17 and so formed in the CUP 6 as to represet the left and right chamber temperatures detected by the left and right chamber temperature sensors 9 and 10, respectively. Through an interface circuit 23 the CPU instructs a left chamber output relay 24 to run or stop the operation of the compressor associated with the left chamber refrigeration unit.

A similar output relay 25 is provided for the right chamber refrigeration unit for similar control thereof.

The control system above operates as follows.

First, the CPU digitizes the detected temperature signals from the left and right chamber temperature sensors 9 and 10 and indicates the signals on the respective indicators 21 and 22. At the same time, based on the data input from the left temperature setting means 18, the CPU 6 calculates the offset value which is defined as the amount to be added to the lowest limit of a given temperature region (for example $-6°$ C. in the control mode "2"). The sum of the lowest limit and the offset value defines the present temperature at which the chamber is maintained. The offset value may be proportional to the amount of the angular displacement of the temperature setting means 18. The same is true for the temperature setting means 19. Should the preset temperatures exceed the upper limit of the temperature ranges, the CPU 6 automatically adjusts the preset temperature within the region.

The actual chamber temperature is compared with the preset temperature thus calculated. In the case of the chamber temperature > the preset temperature, the CPU closes corresponding output relay 24 or 25 via the interface circuit 23 to run the associated refrigeration unit. In the case of the preset temperature > the chamber temperature, the corresponding output relay 24 or 25 is opened to stop the operation of the refrigeration unit. If the two temperatures are its same, the current operation is maintained. Defrosting is started as an internal timer in the CPU 6 counts a predetermined period, when the CPU 6 gives instruction through the interface circuit 23 to stop the refrigerator and turn on a defrosting heater (not shown). The CPU 6 is constantly checking the temperature data supplied from the defrosting termination sensors 11 and 12 in respective chambers to carry out defrosting operation below. Since such defrosting operations may be done independently for left and right chambers, and they are essentially the same in nature, only left chamber case is described below. If the temperature of the left chamber reaches predetermined level the defrosting heater is stopped and refrigeration unit resumes its operation.

In this way the controller 1 having two independent temperature control switching means 3 and 5, allows for independent temperature regions in the left and right chambers, and consequently provides a refrigerator or a freezer or a low-temperature storage that has several chambers operating at different temperatures independently.

As previously described, the provision of the temperature control switching means 3 and 5 and the temperature setting means 18 and 19 help establish a more accurate preset temperature, since the temperature setting means 18 and 19 may be used to adjust the preset value after one of the temperature region was selected by means of the switches. When a rotational variable register is used for such a temperature setting means, a full rotational range of the means is available for this adjustment.

As mentioned above, the controller 1 provides various modes of temperature control over basically two independent refrigeration units. Furthermore, if the refrigerator to be manufactured has only one refrigeration chamber, it suffices to turn off all the switches SW 4, 5, and 6 of the switching devices 3 (prohibiting the operation of the right chamber refrigeration unit (compressor) in the control mode "0"). Consequently, the chamber may be readily controlled by the left chamber refrigeration unit.

When either one of the left and right control switching devices is set in the prohibition mode, no temperature reading (from that temperature sensor) will be given. Neither various alarm signals nor other preventive functions will be given for that control channel either. But it would be clear that it does not hinder the remaining control channel to function.

Figure 2A:
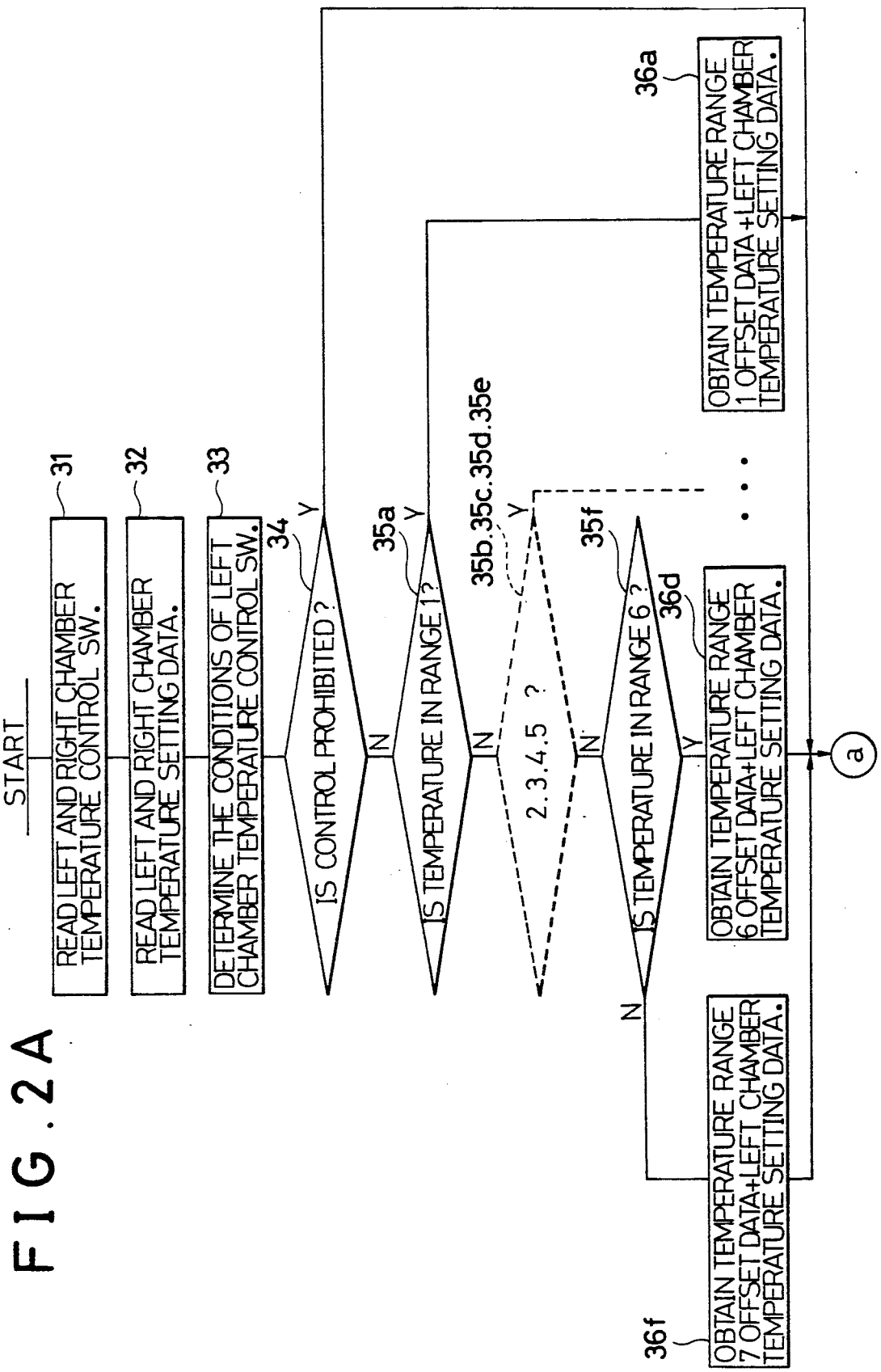
FIGS. 2A and 2B together show a flow-chart for the procedure in calculating the control temperature regions, said procedure being carried out in the refrigeration control system of FIG. 1.
Figure 2B:
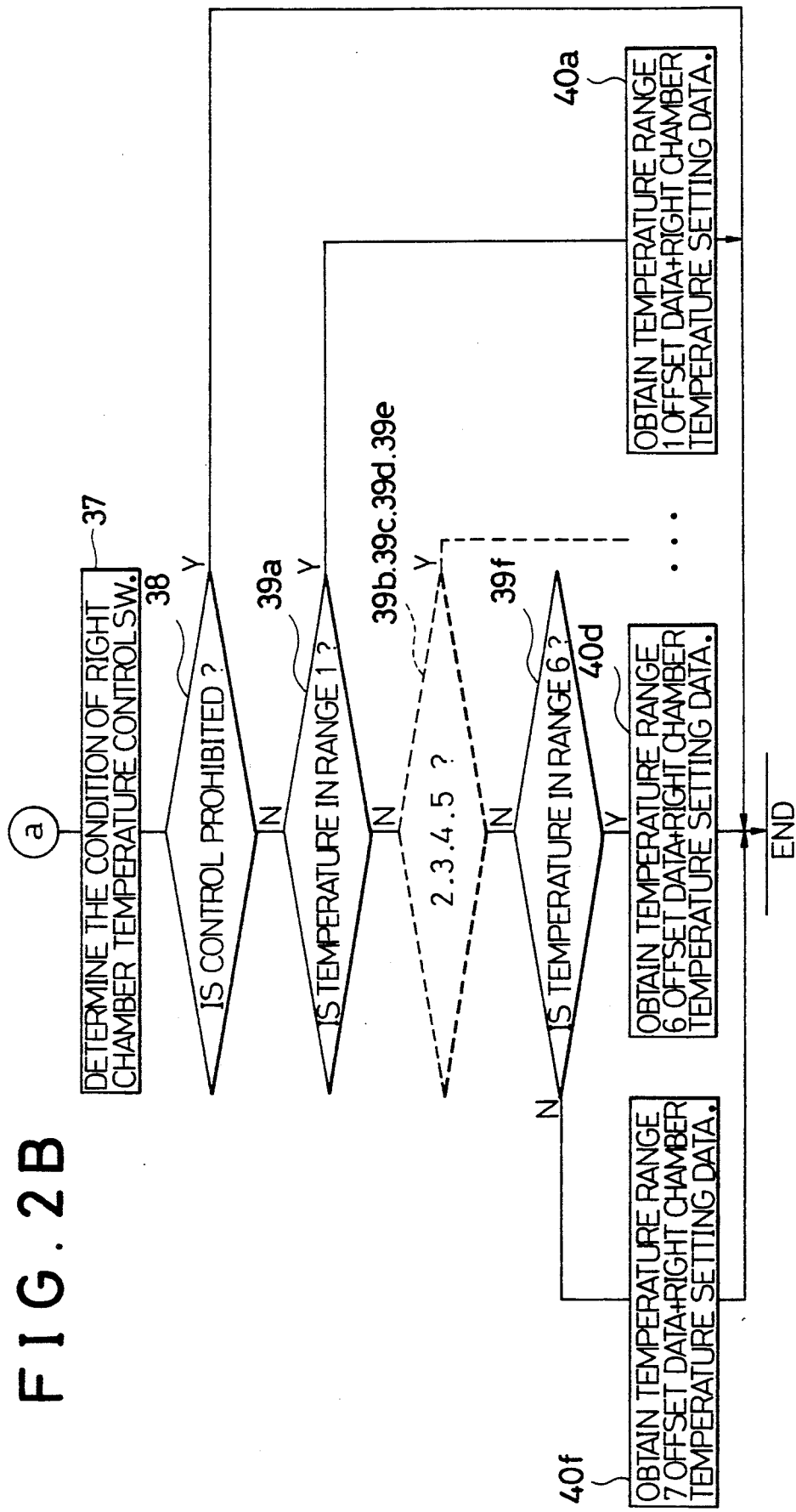

FIGS. 2A and 2B illustrate, a procedure for determining a temperature control region in detail. The CPU 6 reads the conditions of the left and right temperature control switching devices 3 and 5 and stores the reading in its memory (STEP 31), and then stores the left and right temperature data prvided from the A/D converter 17 (STEP 32) in the memory. The CPU 6 then retrieves the data regarding the left switching device 3 to determine the status of the switching device (STEP 33). It is determined whether or not the switching device is in the prohibition mode "0" (STEP 34). If the answer is YES, then no further action is taken for the left refrigeration chamber and the procedure jumps to a similar STEP 37 for the right temperature control switching device 5. If in the determination 34 the answer is NO, the pertinent mode or the condition of the switching device is then determined (STEPS 35$a$ through 35$f$). Then the preset temperature for the mode is calculated based on a given offset data (STEP 36$a$ through 36$f$) to give the preset temperature. For example, if the control mode is "4", an offset data for the temperature region "4" corresponding to the left chamber temperature setting data, is added to the lower limit of the temperature region "4". For the right control channel, similar determination (STEP 37) and procedure (STEP 38, 38$a$-39$f$, 40$a$-40$f$) are made. These preset temperatures are stored in the memory.

Figure 3B:
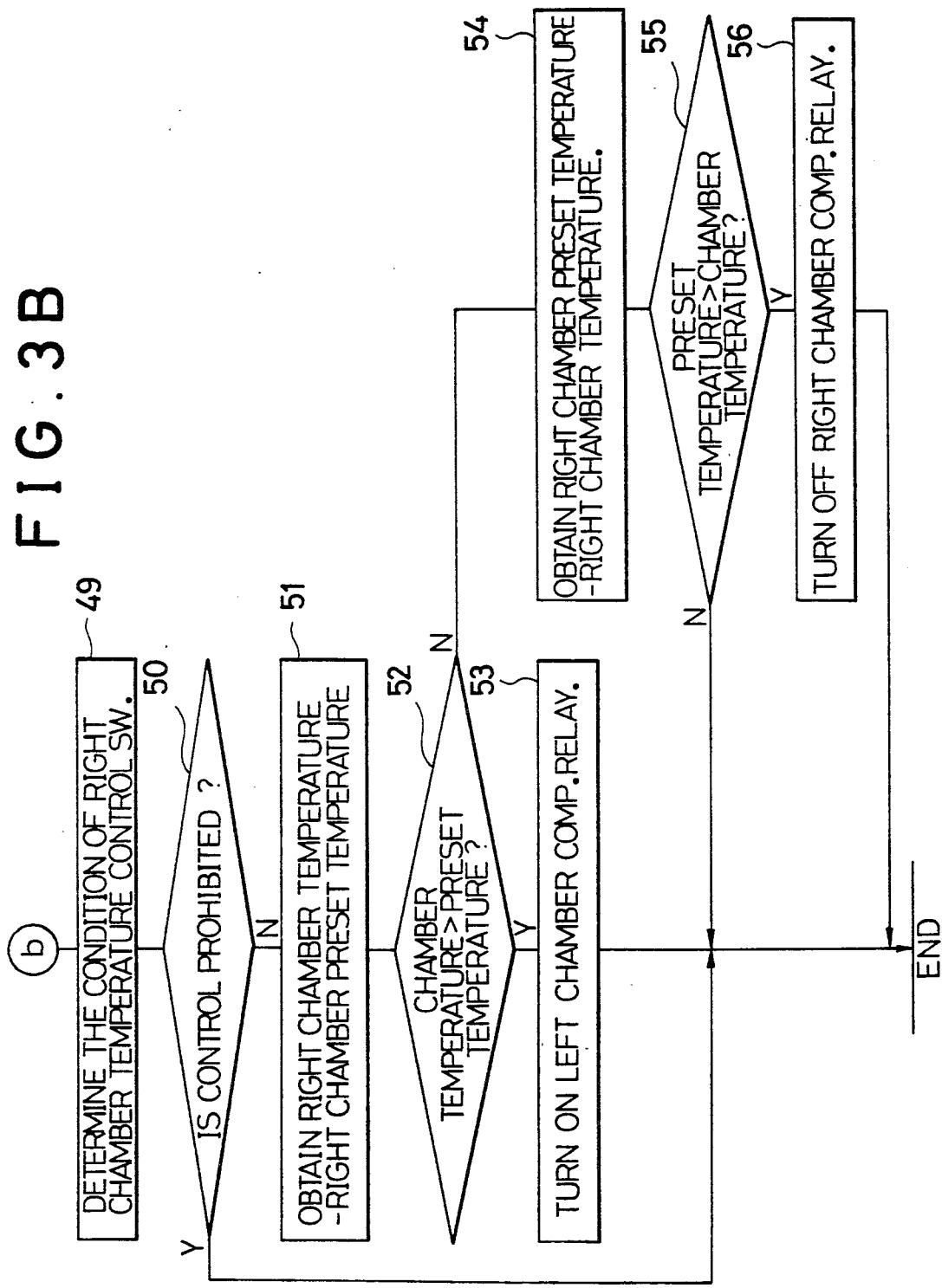

FIGS. 3A and 3B form a flow-chart illustrating the steps of temperature control. The CPU 6 determines the conditions of the temperature control switching device for left chamber (STEP 41). After a decision is made whether the mode is the prohibition mode "0" (STEP 42), the flow jumps to STEP 49 without any actions for the left chamber if it is. If, however, it is not "0", the value obtained in the steps of FIG. 2 is subtracted from the left chamber temperature data (STEP 43). If the chamber temperature > the preset temperature (STEP 44), the left compressor relay is turned on (STEP 45) to restart the refrigeration unit. If instead the decision is "NO", the difference (left chamber preset temperature—left chamber temperature) is calculated (STEP 46) to see if the left chamber preset temperature the left chamber temperature (STEP 47). If the answer is YES, the left chamber compressor relay is turned off (STEP 48) to stop the refrigeration unit. Next, similar steps (49–56) are taken for the right chamber.

Figure 4A:
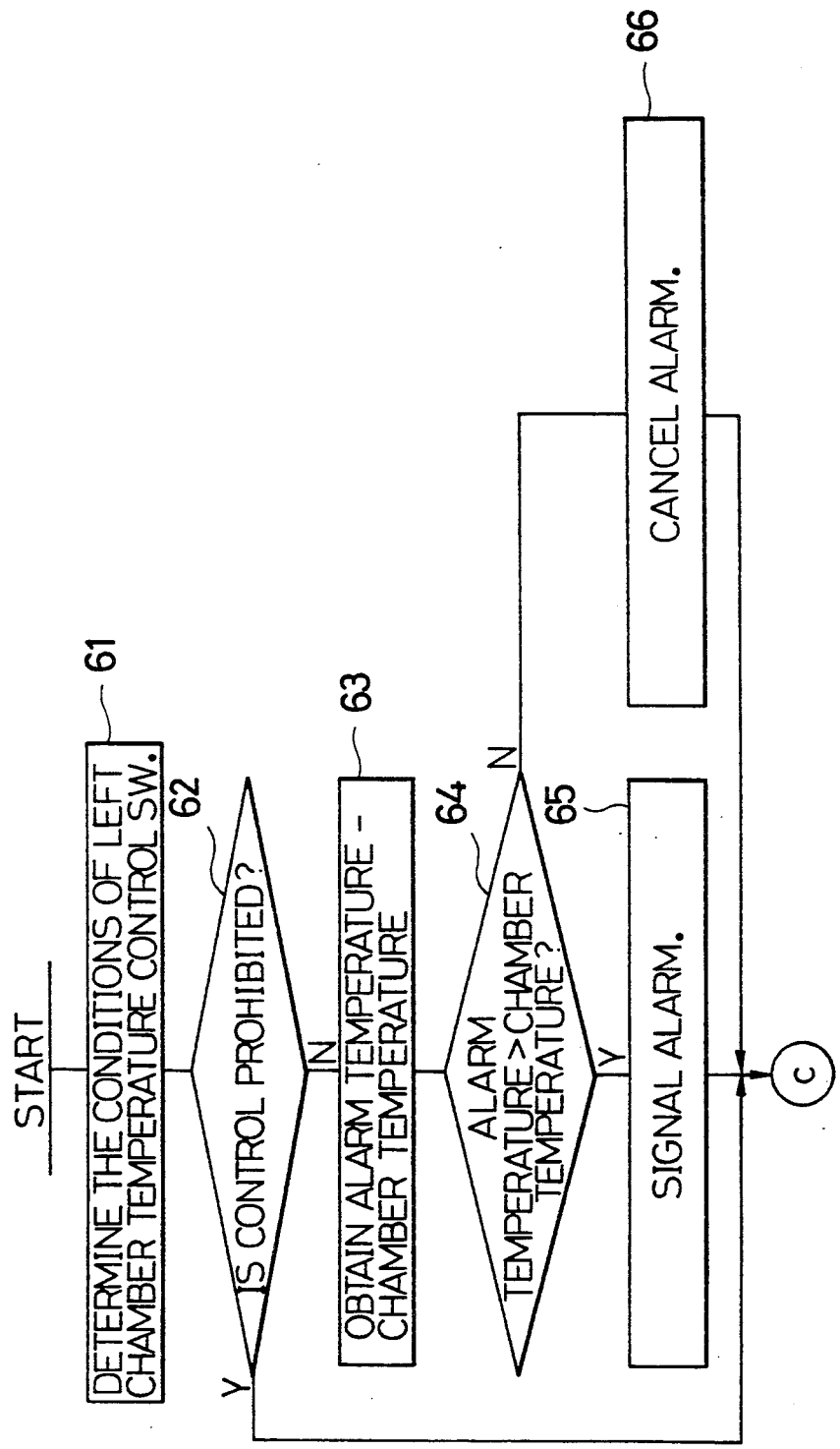

FIG. 4A and 4B form a flow-chart for carrying out a temperature alarm procedure. Temperature alarm is given when chamber temperature exceeds a given preset temperature. Temperature higher than this is regarded as abnormally high. In STEP 61 the mode of the temperature control allowed by the left chamber control switching device is determined. If the mode is found to be "0" (Y), i.e. the prohibition mode (STEP 62), the procedure jumps to STEP 67 without any further action for the left chamber. If instead the mode is not prohibition mode (N), the left chamber temperature is substracted from the preset alarm temperature (STEP 63) to see if the alarm temperature is greater than the chamber temperature (STEP 64). An alarm is issued (STEP 65) if the alarming temperature > the chamber temperature (Y) (STEP 65). If it is not so any more (N), the alarm is cancelled (STEP 66). Similar steps are taken for the right chamber (STEP 67-72).

Figure 5B:
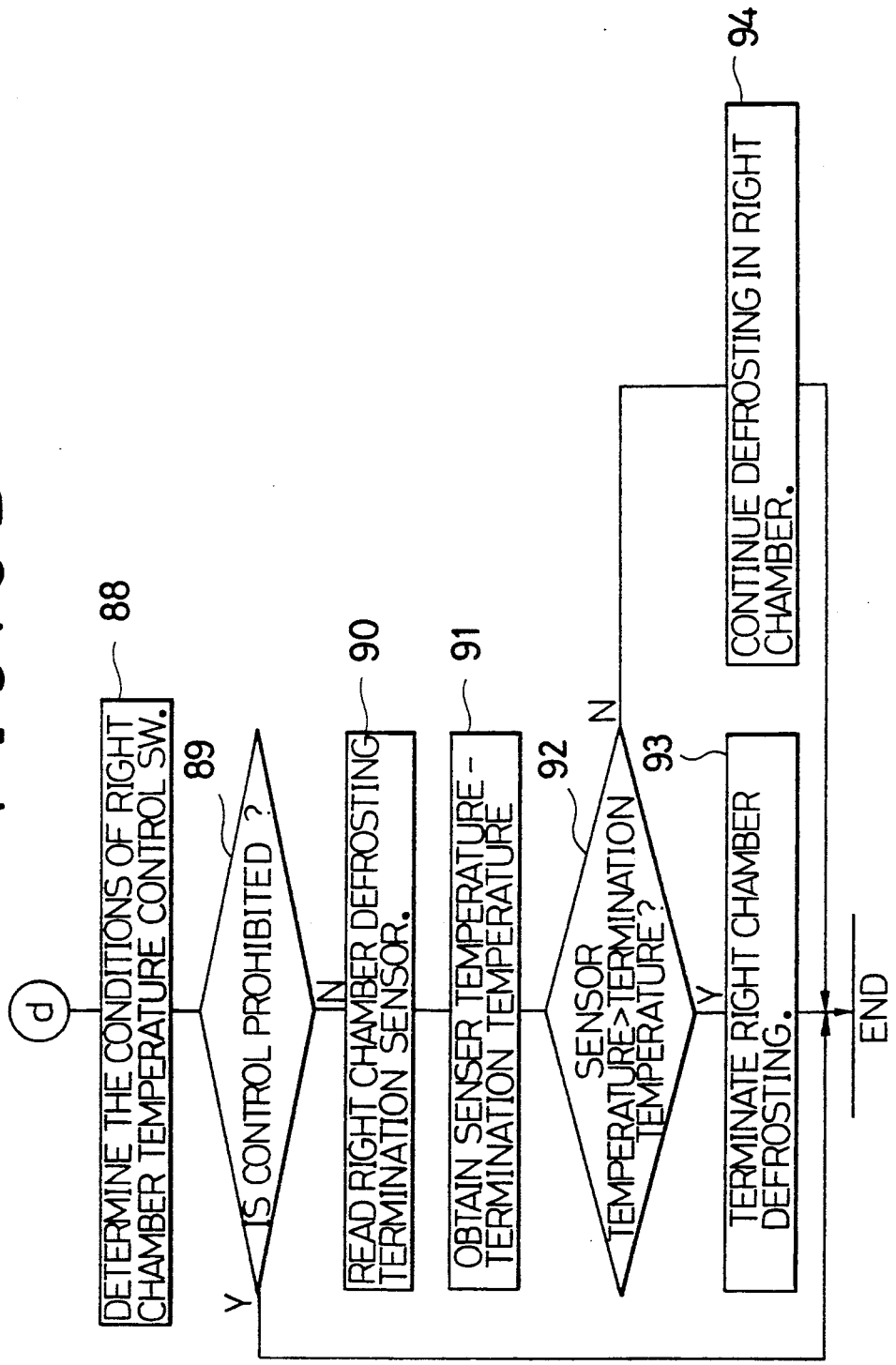

FIGS. 5A and 5B form a flow chart for ending an defrosting operation.

The status of the left chamber control switching device is determined (STEP 81) to see if the mode is PROHIBITING (STEP 82). If the answer is YES, the procedure jumps to STEP 88 for a similar determination for the right chamber, without proceeding any action to the left chamber. If the answer is NO, the temperature taken by the left chamber defrosting termination sensor 11 is read (STEP 83) to subtract it from a predetermined defrosting termination temperature (STEP 84), and then compare the result with the sensor temperature (STEP 85). If the sensor temperature is greater than the defrosing termination temperature, defrosting is ended (STEP 86). If the sensor temperature is not so (N), the defrosting is continued (STEP 87). Similar steps are taken for the right chamber (STEP 88-94) in determining ending/continuation of the defrosting.

Although the invention is described in the above for a two-chamber refrigerator, the situations are the same in cases where more than two chambers are involved. In these cases the controller is provided with a temperature control switching device for each fo the chambers to establish independent temperature control channels for them. By setting some of the switching devices in the prohibition mode, the controller may be utilized for less number of chambers.

Figure 6:
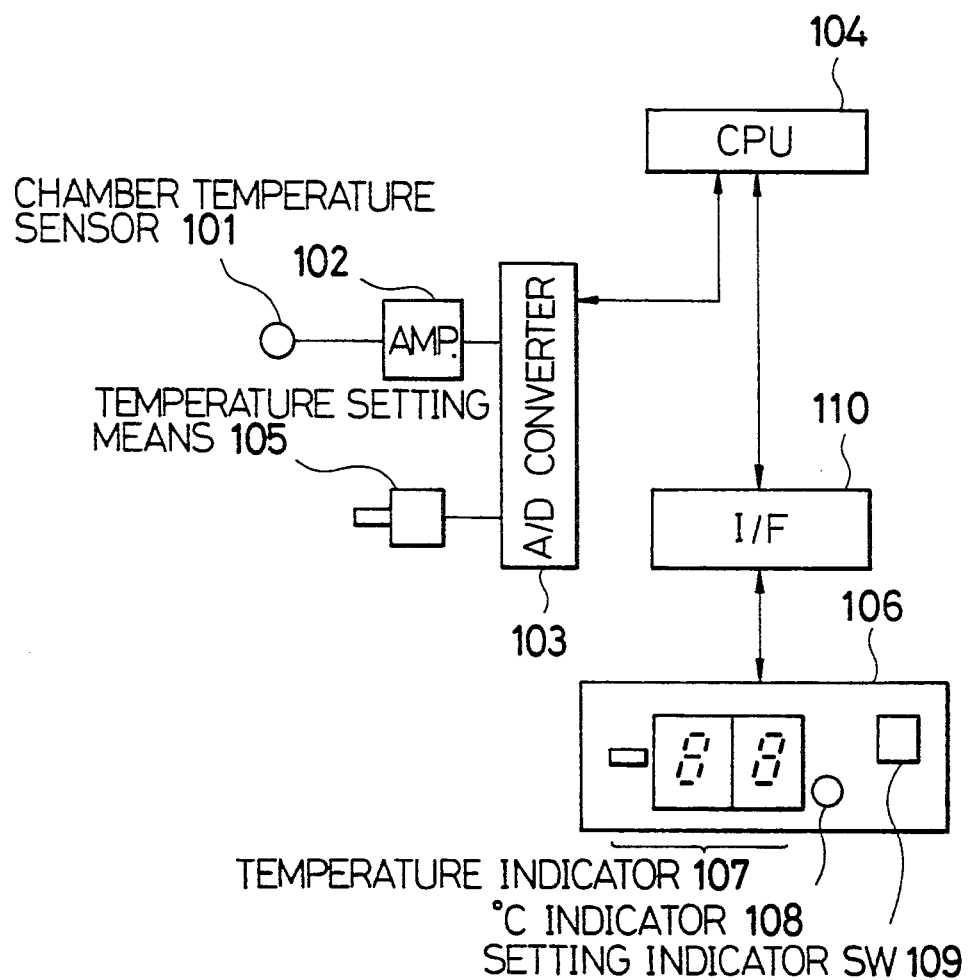
FIG. 6 is a block diagram of a control circuit for use with a temperature indicator, providing the temperature indicator with the chamber temperature and the preset temperature in distinguishable forms.

Referring now to FIGS. 6 and 7, a second ambodiment of the inventions described.

As shown in FIG. 6 the signal from the chamber temperature sensor 101 is amplified to a level suitable for the A/D converter 103 before they are input in the converter. Following the instruction by the CPU 104, the A/D converter 103 converts the analog signals into digital signals and transmits the signal to the CPU 104. To the A/D converter 103 there is also connected a temperature setting means 105 for setting a chamber preset temperature. The signals from the temperature setting means 105 are also transmitted to the CPU 104 after they are A/D converted. A temperature indicator 106, capable of indicating the chamber temperature and the preset temperature as well, comprises a two-digit 7-segment LED indicator 107, a "°C."-mark indicator 108, and a setting indicator (switch) 109, and is connected to the CPU 104 via an interface circuit (I/F) 110. The setting indicator switch is pushed once to start setting the temperature, and pushed once again after the completion of the temperature setting to thereby end the setting operation.

Therefore, the temperature setting depends on the number of times the switch was pushed.

In order to indicate the temperature setting data supplied from the interface circuit (I/F) 110 on the digit indicator 107 and °C.-mark on the indicator 108, the CPU determines the number of such pushes.

On the second push the temperature setting data and °C.-mark data are output to the digit indicator 107 and to the °C.-indicator, respectively, through the interface circuit 110.

Figure 7A:
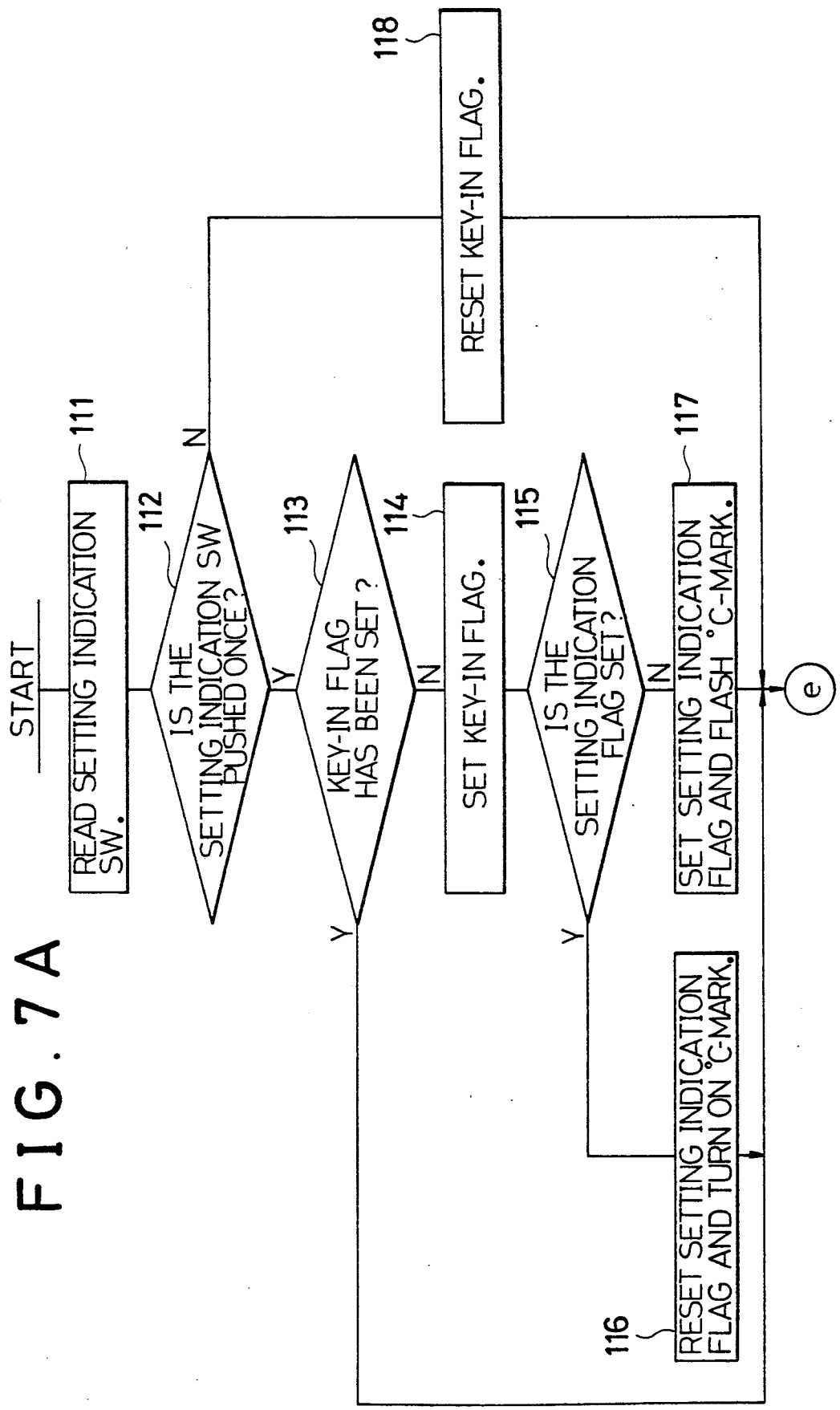
FIGS. 7A and 7B together show a flow-chart for the procedure for indicating a chamber temperature and the associated preset temperature.
Figure 7B:
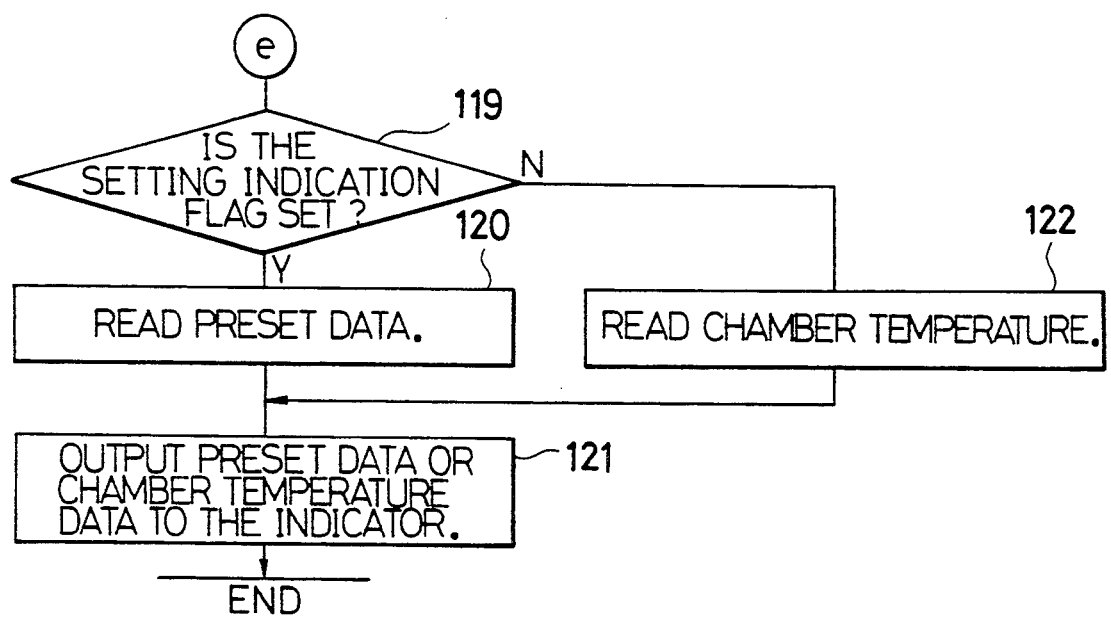

FIGS. 7A and 7B together constitutes a flow-chart for the indication operation described above.

In STEP 111 the status of the setting switch is read to determine if the switch has been pushed (STEP 112). If the switch has been pushed once (Y) when a flag, called key-in flag, has not been set, the key-in flag is set. If the switch has been pushed once (Y) when the key-in flag has been set, the flag is rested.

Namely, the condition of the key-in flag is tested in STEP 113. If the FL flag has not been set (N), the flag is set (STEP 114), and then determines if a temperature setting flag has been set (STEP 115). If the flag has been set (Y), the temperature setting flag is reset and at the same time the °C.-mark is indicated on the indicator (STEP 116). If the flag has not been set (N), the flag is set and °C.-mark is made flashing (STEP 117). Also, if the setting switch has been pushed and hence the flag has been set (Y) in the foregoing STEP 113, an alternative routine is established, which starts with STEP 119. If in STEP 112 the switch is found to be off (N), the key-in flag is reset to deal with a subsequent push of the setting switch (STEP 118). In STEP 119, a decision is made if the temperature setting flag has been set. If the flag has been set (Y), temperature setting data is read in from the temperature setting means 105 (STEP 120), which data is output to the indicator via the interface circuit 110 along with the flashing °C.-mark data (STEP 121). If in STEP 119 no flag has been set (N), the chamber temperature data is read in from the chamber temperature sensor 101 (STEP 122), which is output to the indicator via the interface circuit 110 along with the °C.-mark data (STEP 121).

In this way, from the number of pushes of the switch, the CPU 104 determines if the temperature setting has been made. The °C.-mark is flashed when the setting has been made, thereby indicating whether or not the indicated temperature refers to the chamber temperature or to the preset temperature.

A third embodiment of the invention is now described with reference to FIGS. 8 through 10.

The outputs from chamber A-C temperature sensors 201, 202, and 203, respectively, are amplified by respective amplifiers 204, 205, and 206 to an input level of an A/D converter 207. The A/D converter 207 converts analogue chamber temperature data into digital data following the instruction by the CPU 208, and transfer the digital data to the CPU 208. A temperature indication panel 209 provided on some visible portion of the refrigerator (not shown) includes such indicators as chamber temperature indicators 210, 211, and 212 for chambers A-C, respectively, and an alarm indicator 213 for indicating abnormality in chamber temperature that might occur in one of these chambers. The CPU 208 outputs to the temperature indicators 210, 211, and 212 and the alarm indicator 213, temperature indication data and an alarm indication data, respectively, which are digitized in the interface circuit 214.

The alarm indication system of the invention has a feature that the indicator 213 is turned on to show that some abnormality in chamber temperature has occurred in some chamber, say B-chamber, and flashes the corresponding temperature indicator, say 211 in this case, leaving other indicators turned on without flashing, so that the user will readily notice the one involved in the trouble.

Figure 9A:
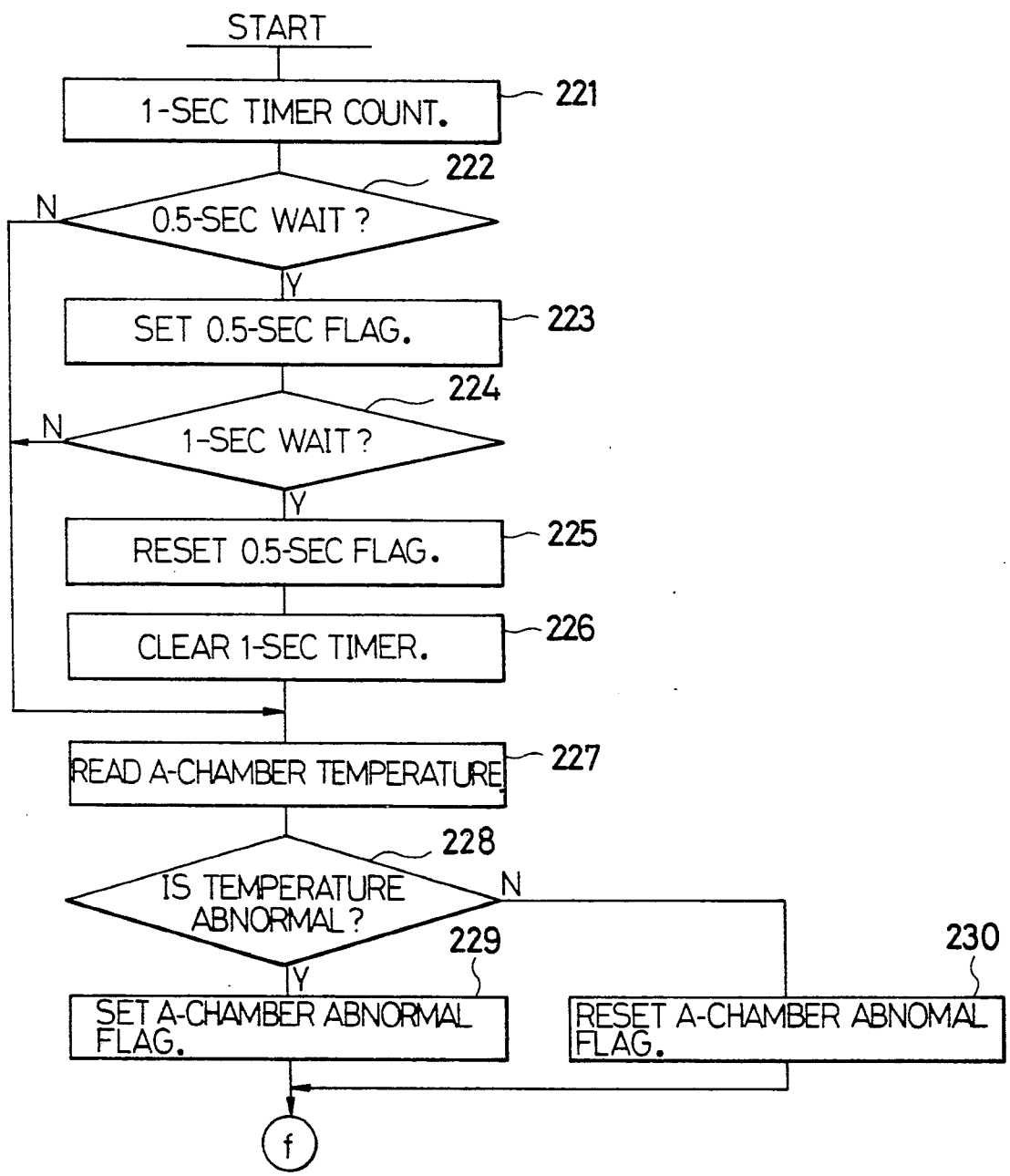
FIGS. 9A and 9B together show a flow-chart for the procedure to find thermal abnormality in chambers.
Figure 9B:
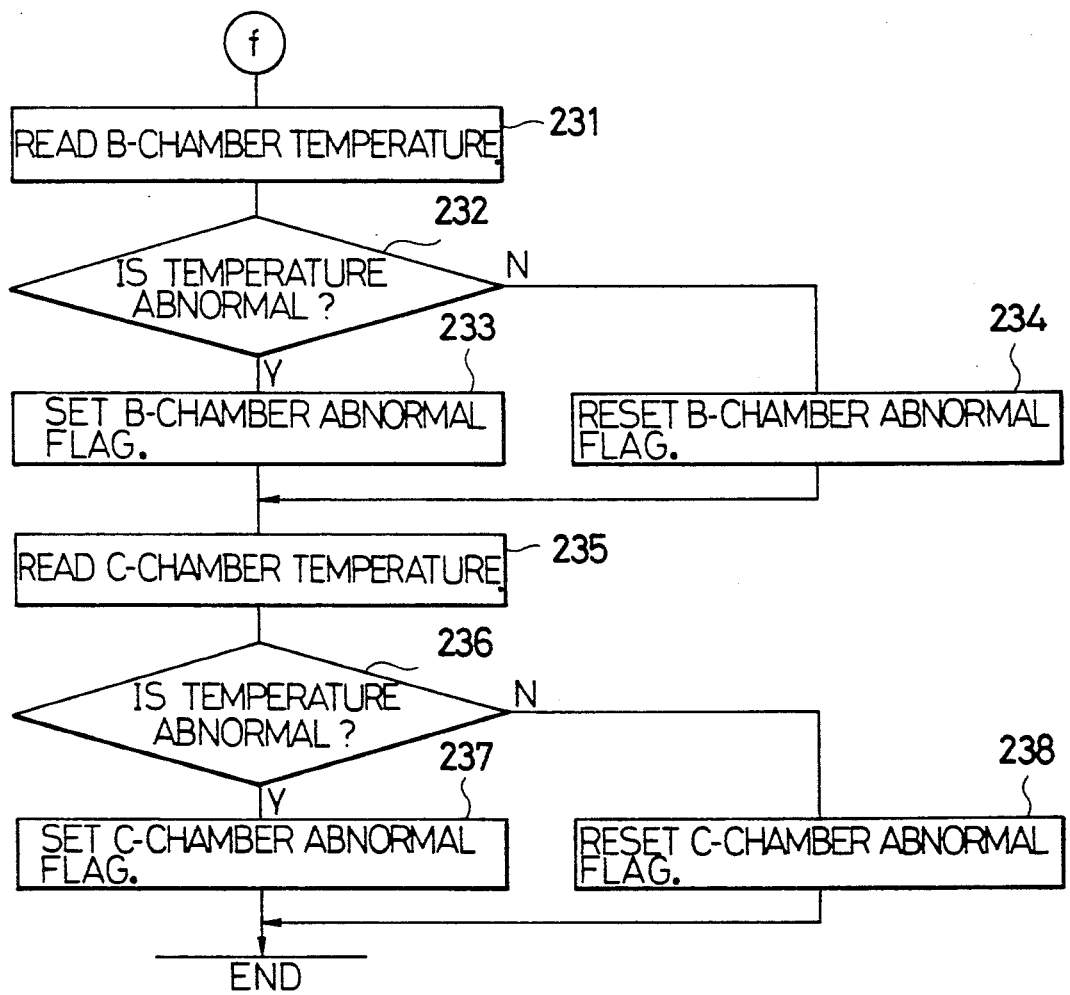

FIGS. 9A and 9B constitute a flow-chart of the alarm procedure mentioned above and the timing needed therfor. In STEP 221, time is counted by 1-sec timer. When a period of 0.5 second is counted by 0.5 sec timer (Y) in STEP 222, 0.5-sec flag (FL) is set in STEP 223. If on the other hand the count hs not reached 0.5 sec (N), the procedure jumps to the abnormality finding steps that start with STEP 227. After setting the 0.5 sec flag in STEP 223, time is checked in STEP 224 if 1 second has reached in the 1-sec counter. If the timer has not counted 1 second, the procedure jumps to the abnormality finding steps mentioned above, but if 1 second has been counted, the 0.5-sec flag is reset in STEP 225 and subsequently clear the 1-sec timer in STEP 226. In this way the 0.5-sec flag is repeatedly set and reset every 0.5 second. This 0.5-sec flags are used in flashing routine, as described more fully in connection with FIG. 10.

In the abnormality finding procedure which starts from STEP 227, chamber temperature is first read in from the A-chamber temperature sensor 1 in STEP 227 and determines if the temperature has reached a predetermined level in STEP 228. If it has (Y), an A-chamber abnormality flag is set in STEP 229, and otherwise reset in STEP 230. Similar abnormality finding procedures are followed in routine STEP 231 through 238 for B- and C-chambers.

FIGS. 10A, 10B, and 10C illustrate, the procedure for flashing the chamber temperature indicators indicating abnormality.

In STEP 241 the condition of the flag for A-chamber abnormality is read to determine in STEP 242 whether the flag has been set or not. If the flag has been set, then in STEP 243 it is asked whether the 0.5-sec flag has been set. If the flag has been set (Y), "blank data" is set (in an appropriate register) in STEP 244, which data is output to the indicator in STEP 246. If the 0.5-sec flag has not been set (N) or the A-chamber abnormality flag has not been set either (N), A-chamber temperature data is set in STEP 245. Therefore, if the abnormality flags are set, the "blank data" and the "temperature data" are alternately generated every 0.5 second. During outputting the blank data on the indicator, an alarm data is also set to turn ON the alarm indicator 213, but otherwise the alarm is reset.

Subsequently, the data comprising the temperature data (which may be blank) and alarm data (to be referred to as the indication data in FIG. 10) are output to the indicator in STEP 246. Similar procedures are repeated in steps 247 through 258 for B- and C-chambers.

We claim:

1. A low-temperature storage comprising:
   a plurality of refrigeration chambers;
   a plurality of refrigeration units each for independently refrigerating each of said chambers at different temperatures;
   a controller, said controller having:
   multiple N sets of temperature range setting means each having a plurality of temperature switches for establishing desired temperature ranges for respective chambers by setting said switches ON or OFF where N is greater than M;
   a multiplicity N of temperature setting means provided one for each of said temperature range setting means for presetting, within respective said temperature ranges, desired temperatures in respective chambers by selectively presetting the temperature setting means, and
   means for controlling an arbitrary number M of refrigeration chambers in a desired combination of modes if the number M of chambers available is less than N, by setting non-used set N-M of said range setting means in a prohibited mode.

2. A low-temperature storage as set forth in claim 1, further comprising the same number of temperature indicators as the number of the refrigeration chambers for indicating the temperatures of said chambers along with "C" marks turned on and for indicating the preset temperatures of said chambers along with flashing "C" marks.

3. A low-temperature storage as set forth in claim 1, further comprising temperature indicators one for each chamber, which temperature indicators are adapted to flash the temperature indication of a chamber or chambers subject to abnormal thermal conditions.

4. A storage as in claim 3, wherein said temperature setting means includes a setting arrangement variable over a predetermined extent substantially coextensive with the range of said range setting means.

5. A storage as in claim 3, wherein said temperature setting means includes a setting arrangement variable over a predetermined extent substantially coextensive with the range of said range setting means.

6. A refrigeration system, comprising:
   a plurality of chambers;
   a separate refrigeration unit for each of said chambers;
   controller means for controlling said refrigeration units;
   a plurality of temperature range setting means coupled to said controller means, each in one of said units and each for controlling the temperature of one of said chambers;
   a plurality of temperature setting means each coupled to said controller means for setting the temperature within each of the ranges set by said range setting means, and
   means for disabling one of said temperature range setting means.

7. A system as in claim 6, wherein said temperature setting means includes a setting arrangement variable over a predetermined extent substantially coextensive with the range of said range setting means.

* * * * *